United States Patent [19]
Tibbott et al.

[11] Patent Number: 5,711,650
[45] Date of Patent: Jan. 27, 1998

[54] GAS TURBINE AIRFOIL COOLING

[75] Inventors: Ian Tibbott, St. Bruno; William Abdel-Messeh, Beloeil; Michael Papple, Nun's Island, all of Canada

[73] Assignee: Pratt & Whitney Canada, Inc., Longueuil, Canada

[21] Appl. No.: 725,990

[22] Filed: Oct. 4, 1996

[51] Int. Cl.⁶ .................................................. F01D 9/04
[52] U.S. Cl. .................................... 415/115; 416/96 A
[58] Field of Search ............................ 415/1, 115, 116; 416/96 R, 96 A, 97 R, 97 A

[56] References Cited

U.S. PATENT DOCUMENTS

| | | |
|---|---|---|
| 3,628,880 | 12/1971 | Smuland et al. |
| 3,982,851 | 9/1976 | Anderson et al. |
| 4,183,716 | 1/1980 | Takahara et al. |
| 4,293,275 | 10/1981 | Kobayashi et al. |
| 4,297,077 | 10/1981 | Durgin et al. |
| 4,526,512 | 7/1985 | Hook . |
| 4,601,638 | 7/1986 | Hill et al. ............................ 415/115 |
| 4,693,667 | 9/1987 | Lenz et al. |
| 4,697,985 | 10/1987 | Suzuki . |
| 5,120,192 | 6/1992 | Ohtomo et al. |
| 5,142,859 | 9/1992 | Glezer et al. |
| 5,352,091 | 10/1994 | Sylvestro . |
| 5,356,265 | 10/1994 | Kercher . |
| 5,383,766 | 1/1995 | Przirembel et al. ............... 416/97 A |

*Primary Examiner*—Christopher Verdier
*Attorney, Agent, or Firm*—Jeffrey W. Astle

[57] ABSTRACT

A cooling system for airfoil vanes in a turbine of a gas turbine engine wherein the airfoil platforms have openings downstream of the insert tube for passing spent platform impingement coolant air into the airfoil cavity downstream of the insert tube to increase the pressure in the aft zone of the airfoil to improve the temperature gradient across the span of the airfoil.

6 Claims, 2 Drawing Sheets

GAS TURBINE AIRFOIL COOLING

BACKGROUND OF THE INVENTION

1. Field of the Invention

The present invention relates to gas turbine engine cooling and more particularly to improvements in cooling the airfoil and platforms of a high pressure turbine vane airfoil.

2. Description of the Prior Art

Cooling turbine vane airfoils and platforms by a combination of impingement and film cooling is well known. For instance coolant air is drawn from the compressed air coming from the engine compressor and is impinged on either or both the vane outer and inner platforms as well as introduced into a tube insert within the hollow vane cavity for the purpose of providing impingement cooling on the inner walls of the vane or for providing film cooling on the airfoil surface. Such cooling systems are summarized in U.S. Pat. No. 5,352,091 issued 4 Oct. 1994 to Sylvestro.

U.S. Pat. No. 5,142,859 issued 1 Sep. 1992 to Glezer et al describes introducing outer platform coolant air to the insert in the cavity and through holes in the insert to impinge upon the inner surface of the hollow cavity of the airfoil. Some of this coolant is introduced to the mainstream gas flow through openings in the trailing edge of the airfoil. The remainder of this coolant (Glezer et al discloses 20%) is removed from the cavity through an opening in the inner vane platform for mixing with another coolant stream, and finally introduced to the mainstream gas flow at a point near the rim seal portion of the inner vane platform. The portion of the spent coolant air emerging in the mainstream gas flow from the trailing edge of the airfoil is at a small angle to the mainstream, relative to the airfoil, and with a high mach number value, resulting in only little energy loss as the mixing of the coolant air and the mainstream gases is reduced. However, that portion of the coolant introduced to the mainstream near the rim seal portion of the inner vane platform or similar location downstream of the outer platform will result in energy losses from this manner of mixing.

Particularly with high temperature environments in which such vanes are now commonly subjected, one of the challenges with such airfoil cooling systems is to introduce relatively large quantities of spent coolant air into the gas path with a minimum of losses, and in a manner in which one may provide effective pressure side film cooling of the vane.

Another challenge is to increase the backflow pressure margin at the trailing edge of a tube insert in the vane, particularly in the presence of local film cooling of the outer surface of the vane, to reduce the risk of hot gas ingestion into the cavity in the vane which may cause airfoil overheating.

SUMMARY OF THE INVENTION

It is an aim of the present invention to provide an airfoil with improved High Pressure Turbine (HPT) aerodynamic efficiency and therefore improve vane and blade stage efficiency by reducing energy losses due to secondary flow mixing as described above.

It is a further aim of the present invention to provide a solution to the above mentioned problems by increasing the margin of resistance to backflow pressure that might occur at the outlet openings provided on the airfoil.

It is still a further aim of the present invention to reduce the coolant air volume required for cooling the airfoil since the redirected, spent, platform impingement coolant air will replace a portion of the compressed air destined for cooling the airfoil.

It is a further aim of the present invention to improve the thermal gradient along the span of the airfoil, particularly in its aft section, and thus extend the life of the airfoil.

A construction in accordance with the present invention comprises an air cooling system for a turbine section airfoil, a gas turbine engine having a mainstream gas path therethrough comprising coolant air bleed means from a compressor section of the gas turbine engine to the airfoil; the airfoil including an airfoil wall having an exterior airfoil shape and defining an internal cavity; the airfoil including a platform at an end of the airfoil; the airfoil including an aft section defining a trailing edge, an insert tube in the cavity extending from the platform and communicating with the coolant air bleed means to pass a portion of the coolant air through the insert tube and into the cavity; air exhaust slots at the trailing edge and along the span of the airfoil across the mainstream gas path for exhausting gas from the cavity to the main stream in the gas path; the airfoil further communicating with the coolant air bleed means to direct another portion of the coolant air to impinge on the platform, the improvement comprising an opening defined in the platform to communicate with the cavity in the aft section between the tube and the exhaust slots in the aft section of the airfoil to exhaust spent platform impingement coolant air through the exhaust slots along with the spent coolant air from the insert tube.

An advantage of this construction is that all coolant air from the inner cavity of the airfoil that is not used for film cooling of the pressure side by the airfoil is introduced into the mainstream gas flow from the trailing edge of the vane with a desirable mach number and angle, thus reducing mixing energy losses for the engine.

All of the coolant air that has been impinged on the platform and supplied to the cavity within the airfoil will increase the pressure in the otherwise relatively low pressure zone in the aft section of the cavity in the airfoil, thereby resisting ingestion of hot gases from the mainstream, particularly in the presence of film cooling.

As well, since the spent coolant air is hotter, after having been impinged on the platform, it will improve the metal temperature gradient along the span of the airfoil.

BRIEF DESCRIPTION OF THE DRAWINGS

The invention will now be described in detail having reference to the accompanying drawings in which.

DESCRIPTION OF THE PREFERRED EMBODIMENTS

Figure 1:
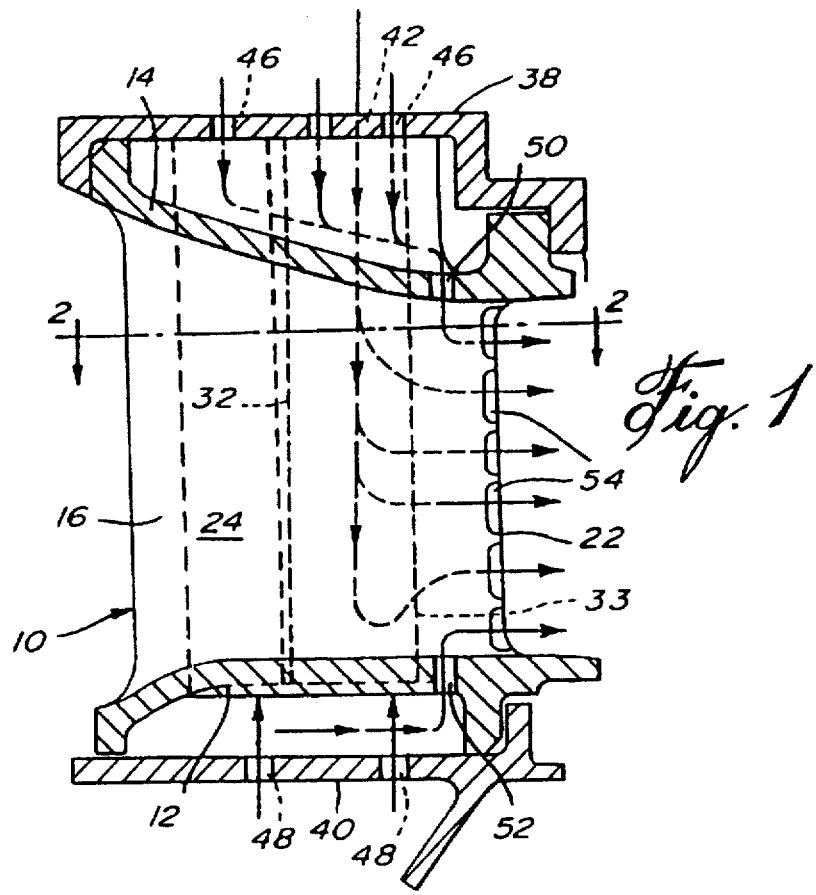
FIG. 1 is a side elevation cross-sectional view of a first stage turbine vane airfoil in accordance with the present invention.
Figure 2:
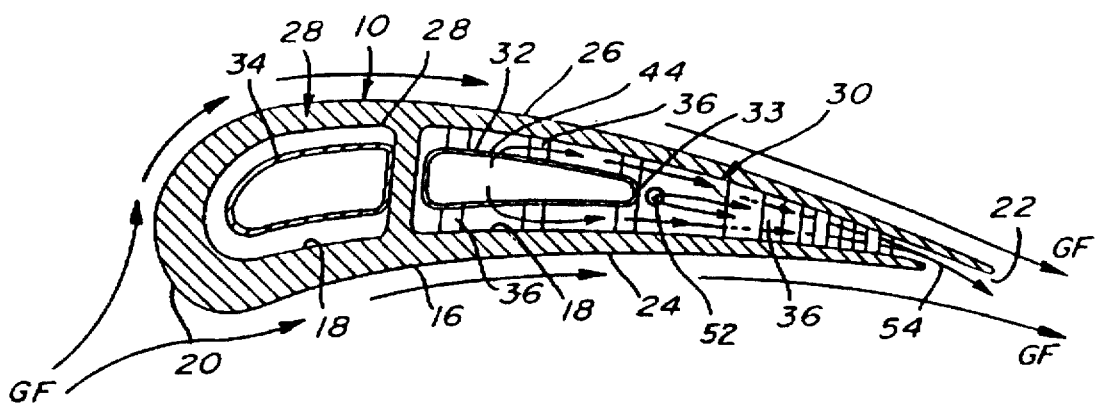
FIG. 2 is a horizontal cross-section taken along lines 2—2 of FIG. 1.
Figure 3:
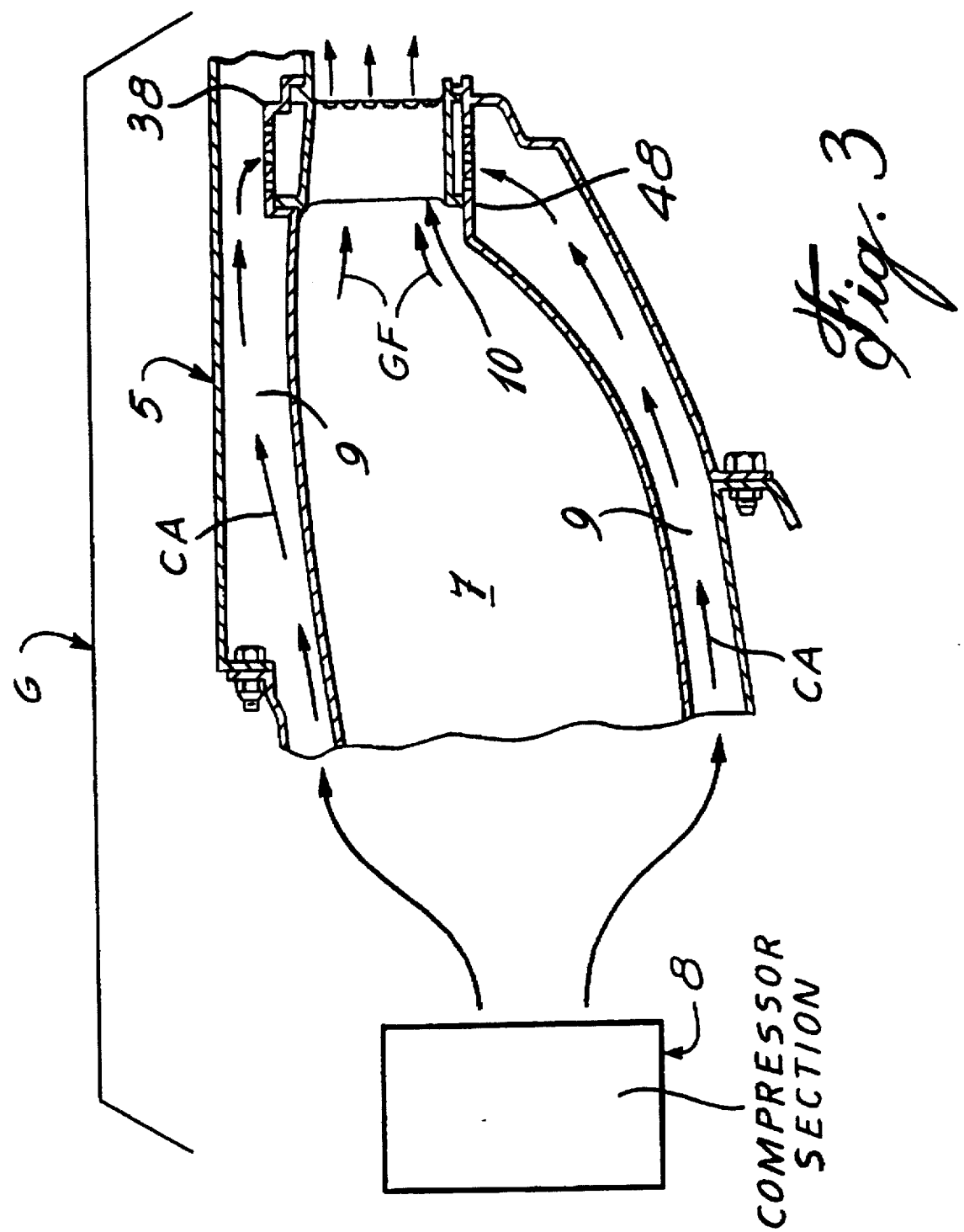
FIG. 3 is a partial schematic view of a combustion chamber, turbine and first vane, and compressor section of a gas turbine engine showing the movement of cooling air and main flow gas relative to the airfoil and platforms of the high pressure turbine vane.

Referring to the drawings, an airfoil 10 for the first stage in a gas turbine 5 of a gas turbine engine G is illustrated having an inner platform 12 and an outer platform 14. The airfoil 10 includes a wall 16 defining at least one cavity 18. The wall has a leading edge 20 with respect to the main stream of the gases coming from the combustion chamber 7 referred to as the gas flow GF in the gas path. As shown in FIG. 1, the vanes 10 in the first stage are arranged in a radial array and supported by a support structure 40 at the inner platform thereof and by a shroud 38 at the outer platform thereof.

The cavity 18 is defined by wall 16 which includes a pressure side 24 and a suction side 26. Although not shown, the wall 16 would have openings communicating with the cavity 18 to permit film cooling on the exterior surface of the wall 16. Coolant air is supplied into the cavity 18 by means of insert tubes 32 and 34 with the insert tube 34 in the fore section 28 of the airfoil and the insert tube 32 in the aft section 30.

Coolant air CA bled from a compressor section 8 passes through an annular air passage 9 surrounding the turbine combustion chamber, and through openings 42 in shroud 38 and into the tube 32. Exit openings 44 may be provided on the pressure and suction sides of the insert tube 32 to allow coolant air to impinge against the wall 16 on the internal surface thereof and possibly, to subsequently pass through openings in the wall 16 to form a coolant film on the exterior surface of the wall 16. In any event the impingement coolant within the cavity 18 that is not utilized for film cooling will pass to the aft section 30 of the airfoil over the protrusions 36 and through the exhaust slots 54 at the trailing edge 22 of the airfoil. The protrusions 36 which are in the path of the coolant air flow from openings 44 increase the heat transfer coefficients of the wall 16.

The air flow past the insert tube 32 causes a low pressure area at the trailing edge 33 of the tube 32.

Coolant air, from the compressor, is also directed through openings 46 in the shroud 38 to impinge against outer platform 14. Similarly, coolant air bled from the compressor may be passed through openings 48 in the support structure 40 to impinge against the inner platform 12. Although the present embodiment utilizes impingement cooling of both inner and outer platforms, 12 and 14, other embodiments contemplated by the present invention may only use impingement of one or the other platform. In the described embodiment, having impingement cooling of both platforms, openings 50 and 52 are located in the platforms 14 and 12, respectively, immediately downstream of the trailing edge 33 of insert tube 32, in order to direct this impingement coolant air into the aft section of the cavity 18 of the airfoil 10. Preferably the openings 50 and 52 are either or both strategically located near the trailing edge 33 of the tube 32 to allow this impingement air, which is entering the cavity at a relatively higher pressure, to increase the pressure in the normally low pressure area downstream of the trailing edge 33 of the tube 32, to therefore increase the overall pressure in this zone, and thereby guard against ingestion of hot gases from the gas flow GF, especially where film cooling of the pressure side of the airfoil is utilized in the airfoil design. This reactivates the separated flow region generated immediately downstream of the insert trailing edge, thus improving heat transfer locally in this region. However, openings 50 and 52 may be located at other locations outside of tube 32 within aft cavity 18.

The coolant air that has impinged on the platforms 12 and 14, has a higher temperature than the coolant gases passing through the insert tube 32. It is known from the prior art, including U.S. Pat. No. 4,293,275 Kobayashi et al, issued 6 Oct. 1981, that the temperature gradient along the span of the airfoil between the inner platform and the outer platform varies considerably with the hotter temperatures in the mid-span region, and cooler temperatures in the inner platform region and the outer platform region. By injecting the spent, hotter platform coolant air through openings 50 and 52 at the outer platform region and inner platform respectively, the temperature gradient, of the walls of the airfoil, from bleed holes 50 and 52 to exhaust slots 54 will be flattened, i.e. reduced, since the temperature at the outer platform region and the inner platform region will have increased and will be closer to the temperature of the air in the mid-span region.

By introducing platform coolant to the mainstream gas flow byway of the cavity 18 of the airfoil 10, rather than through bleed holes directly through a platform into the mainstream, or beyond the vane platform near the rim seal (as in Glezer), a higher pressure within cavity 18 may be maintained relative to the high pressure on the pressure side of the airfoil, thus allowing for film cooling hole placement in the pressure side of the airfoil, further upstream than could be obtained in the prior art vanes.

We claim:

1. An air cooling system for a turbine section airfoil, a gas turbine engine having a mainstream gas path therethrough comprising coolant air bleed means from a compressor section of the gas turbine engine to the airfoil; the airfoil including an airfoil wall having an exterior airfoil shape and defining an internal cavity; the airfoil including a platform at an end of the airfoil; the airfoil including an aft section defining a trailing edge, an insert tube in the cavity extending from the platform and communicating with the coolant air bleed means to pass a portion of the coolant air through the insert tube and into the cavity; air exhaust slots at the trailing edge and along the span of the airfoil across the mainstream gas path for exhausting gas from the cavity to the mainstream gas path; the airfoil further communicating with the coolant air bleed means to direct another portion of the coolant air to impinge on the platform, the improvement comprising an opening defined in the platform to communicate with the cavity in the aft section between the insert tube and the exhaust slots in the aft section of the airfoil to exhaust the portion of the coolant air impinged on the platform through the exhaust slots along with the portion of the coolant air passed into the cavity through the insert tube.

2. The airfoil as defined in claim 1, wherein the platform is an outer platform, and comprising a further inner platform, the inner and outer platforms at the respective ends of the airfoil, wherein the opening is provided in both the outer platform and the inner platform.

3. The airfoil as defined in claim 1, wherein the insert tube has a trailing edge and the opening is located near the trailing edge of the insert.

4. A method of cooling a hollow airfoil in a mainstream gas path in a turbine section of a gas turbine engine, the hollow airfoil having an inner platform and an outer platform and a trailing edge having outlets, comprising the steps of directing compressed coolant air along a flow path to the interior of the hollow airfoil through a conduit in the hollow airfoil, directing a second flow of compressed coolant air to the inner and outer platforms of the airfoil, bleeding the second flow of coolant air into the hollow airfoil downstream of the conduit in the hollow airfoil, directing the coolant air from the first and second flows of coolant air through the outlets in the trailing edge of the hollow airfoil into the mainstream gas path.

5. A method of cooling a hollow airfoil as claimed in claim 4, wherein the second flow of coolant air is bled into the hollow airfoil near to and downstream of the conduit.

6. A method of cooling a hollow airfoil as claimed in claim 4, wherein the first and second flows of coolant air are directed through the outlets in the trailing edge of the hollow airfoil into the mainstream gas path at an angle and mach number similar to the flow in the mainstream gas path.

* * * * *